United States Patent [19]

Waddell

[11] Patent Number: 5,335,836

[45] Date of Patent: Aug. 9, 1994

[54] OVERHEAD CAR CARRIER ATTACHMENTS

[76] Inventor: Troy R. Waddell, P. O. Box 51168, Amarillo, Tex. 79159

[21] Appl. No.: 849,618

[22] Filed: Mar. 10, 1992

[51] Int. Cl.$^5$ ............................................. B60R 9/00
[52] U.S. Cl. ................................. 224/329; 224/322
[58] Field of Search ................. 410/96, 101, 102, 106, 410/108; 296/37.7; 248/300, 503, 505; 24/68 CD, 17 R; 224/309, 314, 318, 321, 322, 323, 329, 330

[56] References Cited

U.S. PATENT DOCUMENTS

| | | | |
|---|---|---|---|
| 2,423,253 | 7/1947 | Potts | 224/329 |
| 3,116,861 | 1/1964 | Spence | 224/329 |
| 3,495,750 | 2/1970 | Oliveira | 224/329 |
| 4,253,594 | 3/1981 | Parks | 410/101 X |
| 4,452,385 | 6/1984 | Prosen | 224/329 |
| 4,483,471 | 11/1984 | Prosen | 224/309 X |
| 4,586,638 | 5/1986 | Prescott | 224/329 |
| 4,681,247 | 7/1987 | Prosen | 224/329 |
| 4,684,049 | 8/1987 | Maby | 224/329 |
| 4,995,538 | 2/1991 | Marengo | 224/329 |
| 5,014,890 | 5/1991 | Perry | 224/329 |

FOREIGN PATENT DOCUMENTS

| | | | |
|---|---|---|---|
| 177758 | 4/1986 | European Pat. Off. | 224/309 |
| 3445021 | 6/1985 | Fed. Rep. of Germany | 224/309 |
| 0163040 | 7/1986 | Japan | 224/309 |
| 8704982 | 8/1987 | PCT Int'l Appl. | 224/309 |

*Primary Examiner*—Frank E. Werner
*Assistant Examiner*—Stephen Gordon
*Attorney, Agent, or Firm*—Dowell & Dowell

[57] ABSTRACT

Mounting brackets for securing overhead car carriers and racks to the roof of automotive vehicles which include a first contoured end cooperatively engaging an inner door frame of the vehicle, an intermediate strap portion configured to extend from the contoured end and between the door and frame to a point adjacent the vehicle roof, and an attachment end to which the carrier or rack may be selectively secured. In one embodiment, the intermediate strap is formed as a flexible member.

3 Claims, 2 Drawing Sheets

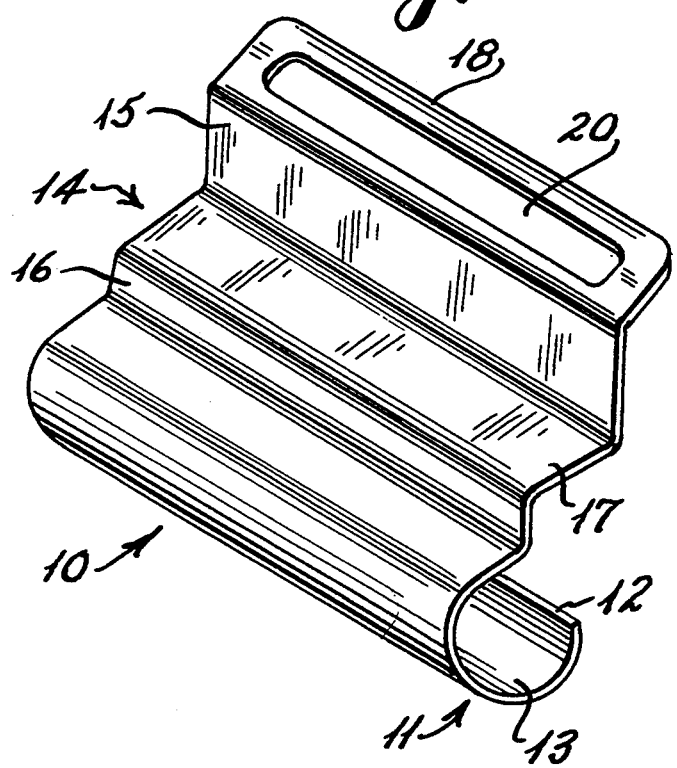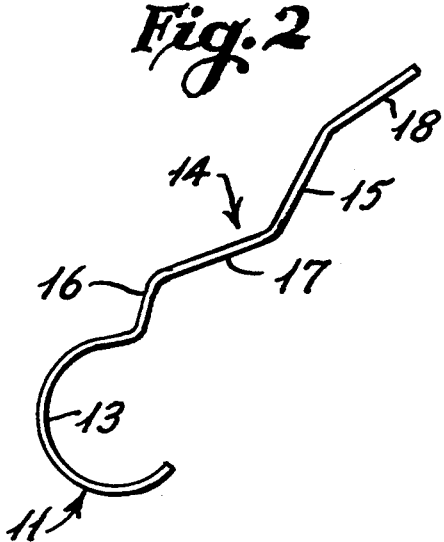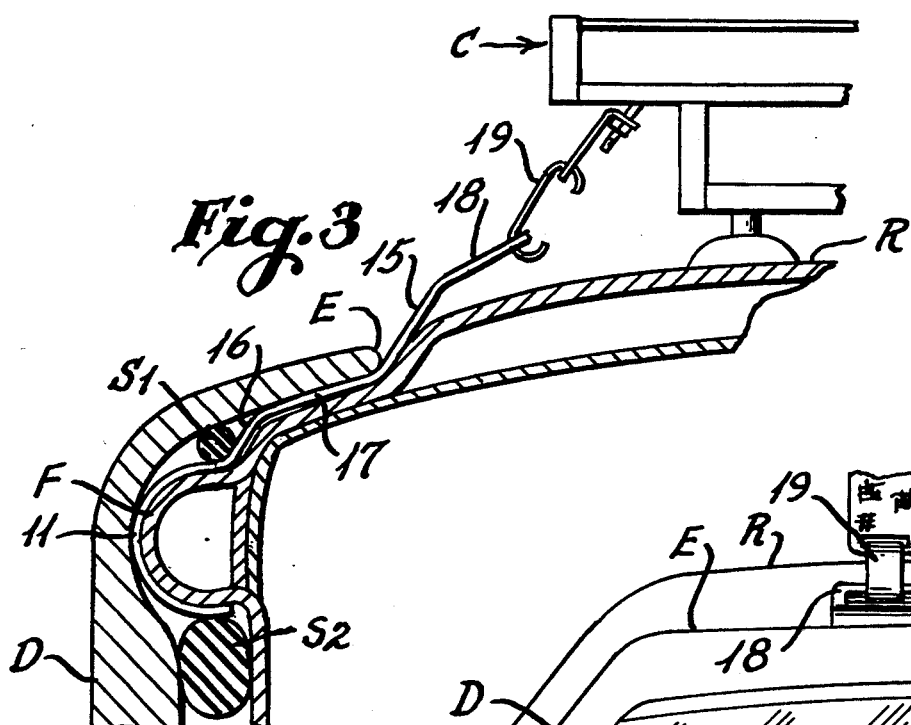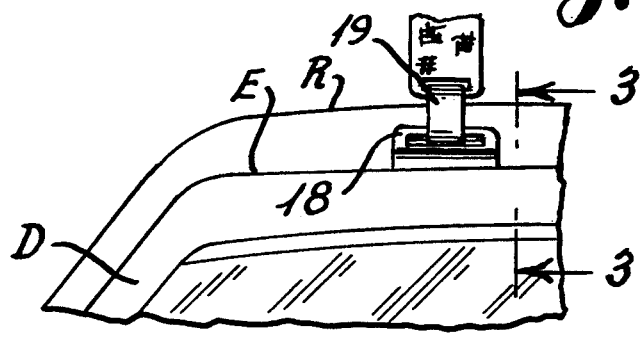

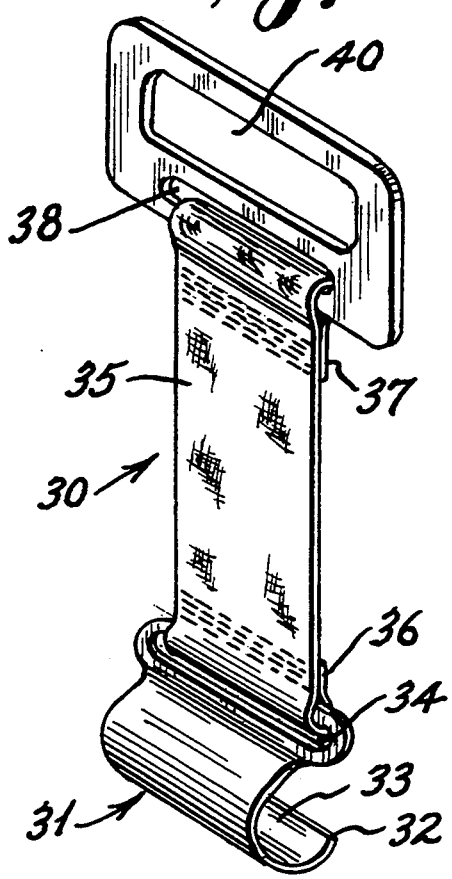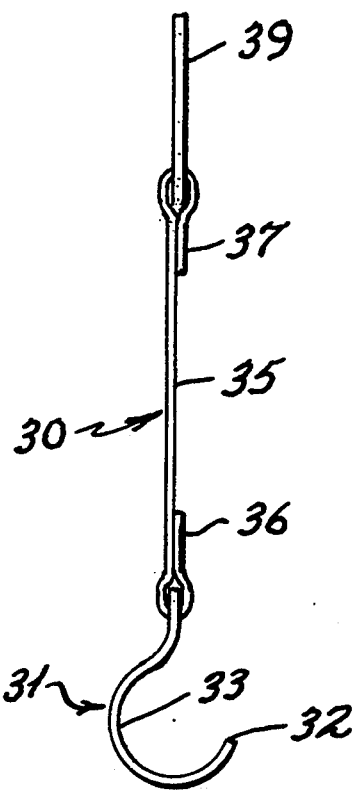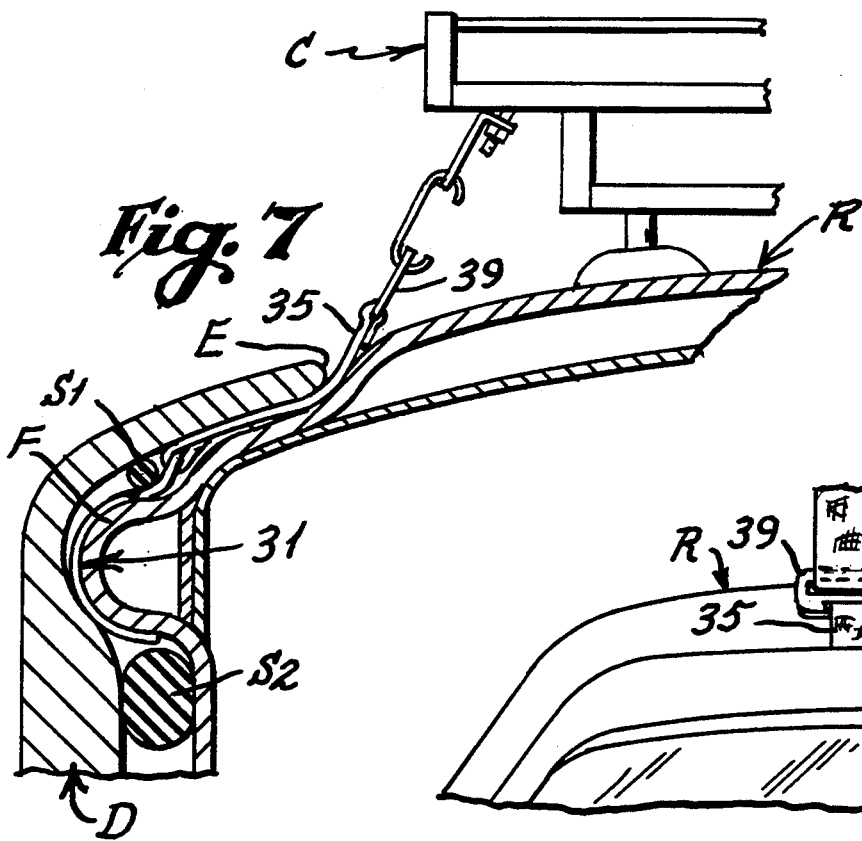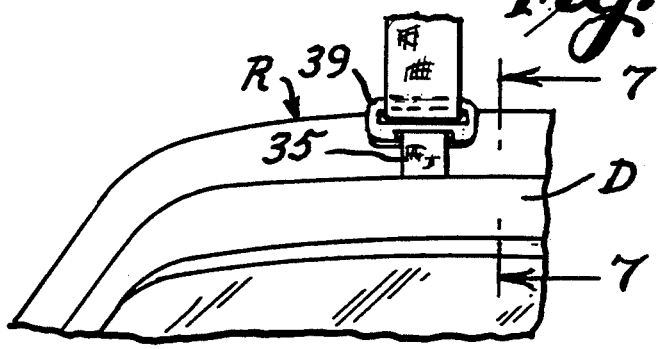

OVERHEAD CAR CARRIER ATTACHMENTS

BACKGROUND OF THE INVENTION

1. Field of the Invention

This invention is generally directed to tie down or anchoring systems by way of which automobile luggage racks and carriers are secured to the roof of conventional automotive vehicles and, more particularly, to brackets which are designed to be used with conventional automotive vehicles of the type which do not have rain or drip gutters associated therewith above the door line and where the upper edge of the door is generally coextensive with the adjacent roof line and wherein the brackets are designed to engage a portion of the door frame at a point between the frame and the upper portion of the door below the weather seal located along the upper edge of the door.

2. History of the Related Art

There are numerous carriers and racks which have been specifically designed for use with automotive vehicles. In some instances, the racks are directly mounted or bolted to the vehicle roof and are common on many station wagons and vans. However, there are also numerous types of carriers and racks which are portable and designed to be selectively attached to the roof of automotive vehicles whenever it becomes necessary to transport luggage or other articles such as skis, bicycles, trunks, building supplies, and other materials. Conventional portable automotive roof racks and carriers include support beams which are mounted to somewhat resilient supports which serve to protect the finish of the vehicle from damage during use of the racks. The outer ends of the support beams generally includes a flexible attachment strap having outer ends which include a hook which may be engageable about the rain or drip gutter associated with many vehicles. One such roof rack is disclosed in U.S. Pat. No. 3,495,750 to Oliveira. Other types of conventional roof racks may include structure whereby the frame of the racks does not engage the roof of the vehicle but is only mounted to the rain gutters of the vehicle utilizing rigid and flexible hook-like devices. An example of such a structure is disclosed in U.S. Pat. No. 3,116,861 to Spence.

Over the years, automotive manufacturers have sought to develop car designs offering low wind resistance. As a result, newer automotive vehicles do not incorporate rain or drip gutters and the doors are mounted generally flush with the surrounding body structure and roof line. Because of this, different types of mounting arrangements for supporting roof racks and carriers were developed for engaging the ledge or bead associated with the roof in the area of the door opening. Typically, such attachment devices incorporate V-shaped hooks which are pulled tight against a lip formed at the edge of the roof in the area of the door. Some examples of such structures are disclosed in U.S. Pat. Nos. 4,586,638 to Prescott et al., 4,684,049 to Maby et al, and 4,995,538 to Marengo.

Unfortunately, such hook type engagement devices for mounting roof racks and carriers to the roof of automotive vehicles do not provide secure anchors and rely upon the tension placed on the hooks as they are pulled against the edge of the roof. Under some conditions the hooks can slide relative to the roof thereby allowing the roof racks or article carriers to shift, especially if sufficient tension is not placed on the hooks when they are installed. In addition, not all roof designs provide sufficient ledges in the area of the door frame to permit hook type devices to be utilized to securely anchor roof racks and article carriers.

Other examples of anchoring systems for automobile roof racks and article carriers are disclosed in U.S. Pat. Nos. 2,423,253 to Potts et al., 4,452,385 to Prosen, 4,681,247 to Prosen, and 5,014,890 to Perry.

SUMMARY OF THE INVENTION

This invention is directed to attachment devices for securing portable automobile carriers and racks to the roof of automotive vehicles of the type having doors which are mounted generally flush with the adjacent roof and wherein an upper inner door frame is spaced below the upper edge of the door in opposing relationship with respect to the door and which is normally sealed by at least one gasket element which is placed between the upper inner portion of the door and an area above the upper inner door frame. The attachments include a first contoured inner end, which is generally semi-cylindrical in configuration so that the upper door frame is cooperatively seated therein. The attachments further include an intermediate strap portion which extends upwardly from the inner end portion and intermediate the sealing gasket and the upper edge of the door and the adjacent roof to an outer attachment end. The outer attachment ends include an anchor, tie down, lock or other device to which a strap, hook or other device associated with a conventional car carrier or roof rack may be selectively secured to thereby anchor the carrier or rack to the roof of the vehicle. In a first embodiment, the attachment device is formed as a single body which is contoured along its length so as to be cooperatively seated at the interface between the vehicle door and the door frame and which may be coated with rubber or other protective material to prevent damage to the surface of the automotive vehicle. In another embodiment of the present invention, the inner and outer ends may be connected by a flexible strap which may be a canvas member having its lower end secured to the contoured inner portion of the device and its outer end secured to the outer attachment end.

It is the object of the present invention to provide mounting brackets which may be utilized with conventional automotive vehicles of the type wherein the doors are generally mounted flush and coextensive relationship with respect to the roof and wherein the door is sealed to the door frame at a point below the upper portion of the door and the roof in such a manner that the mounting brackets are positively secured to the inner and upper door frame and are also prevented from shifting relative to the door frame by the compression of the door against the door frame when the mounting brackets are in use.

It is a further object of the present invention to provide a low cost and yet effective attachment device for securing portable automobile roof racks and carriers to automotive vehicles which may be interchangeably utilized on a plurality of different models of vehicles regardless of the interface structure between the door and the upper door frame.

BRIEF DESCRIPTION OF THE DRAWINGS

FIG. 1 is a front perspective view of a first embodiment of the present invention wherein the attachment bracket is formed as an integral one-piece unit.

FIG. 2 is a side elevational view of the bracket of Fig. 1.

FIG. 3 is a cross-sectional illustrational view of the mounting bracket of FIG. 1 shown mounted intermediate the door and door frame of a conventional automotive vehicle.

FIG. 4 is a side illustrational view of the invention in use as shown in FIG. 3.

FIG. 5 is a perspective view of a second embodiment of the present invention wherein the inner and outer ends of the bracket are joined by a flexible strap.

FIG. 6 is a side elevational view of the embodiment of FIG. 5.

FIG. 7 is a cross-sectional view showing the second embodiment of mounting bracket as it is attached intermediate the upper portion of the door and the door frame and connecting to a conventional roof rack.

FIG. 8 is a side view of the mounting bracket shown in FIG. 7.

DESCRIPTION OF THE PREFERRED EMBODIMENT

With particular reference to FIGS. 3 and 4, and 7 and 8 of the drawings, the mounting brackets of the present invention are particularly designed to permit portable roof racks or carriers C to be secured to the roof R of automotive vehicles of a type which do not incorporate a rain gutter or guard. Newer models of automotive vehicles have been designed to reduce wind resistance and are generally more streamlined than vehicles were ten years ago. Newer vehicles generally are designed so that upper edges E of the doors D are coextensive and generally flush with the surrounding body. As shown in FIGS. 3 and 7, the upper edges E of the doors D extend generally flush with the surface of the roof R. Further, in many vehicles, the roof does not incorporate a ledge adjacent the upper edge of the door and, in fact, may bevel outwardly as shown in the drawing figures. Therefore, there is no edge adjacent the space between the upper edge of the door and the roof to which conventional mounting brackets incorporating generally V-shaped hooks can be utilized to mount the carriers C to the roof of the vehicles.

As further shown in the drawings, the door D is sealed with respect to the inner upper door frame F which projects outwardly from the frame by way of upper and lower sealing gaskets or weather stripping S1 and S2. The present invention is directed to mounting brackets having inner portions which are designed to cooperatively seat between the door and the upper door frame F and extend upwardly between the upper seal S1 and between the upper edge E of the door and the roof R.

With specific reference to FIGS. 1–4, a first embodiment of the present invention is shown in detail. In this embodiment, the mounting bracket 10 is shown as being formed as a one-piece unit and may be constructed of molded plastic or of metal which is appropriately coated with rubber or other soft material to prevent scratching or damage to the surface of the vehicle when placed in installation as shown in FIGS. 3 and 4. The mounting bracket 10 includes an inner contoured end 11 which is generally semi-cylindrical terminating in a lower edge 12. The contoured end includes an inner elongated concave face 13 which is of a size to be cooperatively seated in flush engagement against the upper door frame F, as shown in FIG. 3, with the lower edge 12 thereof generally extending between the frame and the lower sealing gasket 52. In this manner, the contoured end 11 serves as an anchor for preventing the bracket from being withdrawn by any force being directed along the length of the bracket when installed. The intermediate portion 14 of the bracket 10 is somewhat Z-shaped in configuration having upper and lower generally parallel walls 15 and 16 which are oriented upwardly when installed, as shown in FIG. 3, and an intermediate section 17. The exact configuration of the intermediate portion may change depending upon different styles and models of automotive vehicles, however, if the bracket is constructed so as to be somewhat resilient, such as by forming of molded plastic, then the bracket will yield somewhat to accommodate for variances in the interface between the inner surface of the door and the area of the body immediately below the door.

Extending outwardly from the intermediate portion is the outer end 18 of the bracket which serves as the anchoring device to which a conventional strap, belt or other mechanical fastener 19 may be secured. In the embodiment shown, the attachment end 18 includes an elongated slot 20 through which a conventional hook type mounting device or belt may be selectively extended and secured.

With the bracket 10 installed as shown in FIGS. 3 and 4, the cooperative seated engagement of the upper door frame within the lower portion 11 of the mounting bracket anchors the bracket so that it cannot be pulled outwardly between the upper edge of the door and the roof. Further, when the door is closed relative to the frame, the lower and intermediate portions of the bracket are compressed between the door and the frame and body thereby preventing the bracket from sliding longitudinally relative to the door and door frame and thus prevents shifting of the bracket during use.

With specific reference to FIGS. 5–8, a second embodiment of the present invention is shown in detail. The mounting bracket 30 includes an inner contoured anchoring end 31 which is shown as being generally semi-cylindrical in configuration, having a lowermost edge 32 and concave inner face 33. The inner end 31 is cooperatively formed in a configuration to be seated against the frame F in the same manner as discussed above with respect to the embodiment shown in FIGS. 1–4 so that the inner face 33 thereof is in generally continuous abutment with the door frame and with the lower edge generally situated between the door frame and the lower door gasket or seal S2.

It should be noted that, in some instances, the lower anchoring end 31 of the bracket may be formed with a more rectilinear inner face 33 in the event the door frame is more rectilinear in cross section. It is the primary essence of the clamp that the anchoring end 31 be configured or be made pliable so as to cooperatively seat against the inner door frame F, as is shown in the drawing figures, regardless of the configuration of the inner door frame. This holds true for the embodiment shown in FIGS. 1 and 2 as well.

The upper portion of the lower end 31 includes a slot or opening 34 through which a flexible intermediate strap 35 may be selectively received. Unlike the previous embodiment where the intermediate strap was formed as a plurality of generally rigid wall portions which were integrally formed with respect to one another, in this embodiment the intermediate strap is flexible and is shown in the drawings as being formed as a canvas strap having its lower end 36 sewn against the body of the strap after being passed through the opening 34 in the inner end portion 31. In a like manner, the upper end 37 of the strap is inserted through an elongated slot or opening 38 formed in the outer attachment end 39 of the clamp and sewn against the body of the strap as shown in FIG. 5. The length of the strap may vary, however, the strap must be long enough to insure that the attachment end 39 is mounted at a point beyond the upper edge of the door and the roof, as is shown in FIG. 7. The attachment end 39 includes an enlarged opening 40 to which a conventional mounting belt, strap, or hook device may be secured to thereby attach the roof carrier C to the mounting bracket 30.

As with the previous embodiment the mounting bracket 30 is designed to be secured with the inner end 31 in flush and seated relationship with respect to the door frame F with the strap extending upwardly and outwardly therefrom between the door and the lower roof with the inner end of the bracket providing an anchor which will prevent the bracket from being pulled from engagement with the frame when in use. Further, once the door is closed against the door frame, the inner portion 31 and intermediate portion 35 of the bracket will be compressed between the door and door frame and body thereby preventing any longitudinal shifting of the mounting bracket during use. It should further be noted that once the mounting brackets of the present invention are installed, the doors are freely opened and closed without adversely affecting the positioning of the mounting brackets.

I claim:

1. A mounting bracket for use as a tie down for overhead carriers and racks to secure the carriers and racks to a roof of an automotive vehicle having a door which is selectively closed with respect to an inner door frame have an upper frame edge which protrudes outwardly and which is sealed by at least one seal extending between the door and the upper frame edge and wherein the door has an upper edge which is generally flush with the roof, the bracket comprising an inner end portion of a configuration to cooperatively receive the upper frame edge of the door therein, said inner end portion of said mounting bracket being generally semi-cylindrical in configuration having an inner concave surface with is engageable with the upper frame edge of the door, an intermediate strap portion extending from said inner end portion of a length and configuration to extend from the upper edge of the door frame, beyond the at least one seal and through an interface between the door and the roof, said intermediate strap portion having first and second end portions, said first end portion connected to said inner end portion and having an outer surface which is substantially reversely curved with respect to said inner concave surface of said inner end portion, wherein said intermediate strap portion is generally Z-shaped whereby said first and second end portions are generally parallel to one another and are interconnected to one another by an intermediate section, and an outer end portion, said outer end portion having means for anchoring the carriers and racks thereto.

2. The mounting bracket of claim 1, in which said intermediate strap and outer end portions of said mounting bracket are integrally formed.

3. The mounting bracket of claim 1, in which said anchoring means in said outer end portion includes an elongate opening therein.

* * * * *